United States Patent [19]

Yamagishi

[11] Patent Number: 4,513,950

[45] Date of Patent: Apr. 30, 1985

[54] GARAGE JACK FOR LIFTING AN AUTOMOBILE

[75] Inventor: Takeshi Yamagishi, Fujinomiya, Japan

[73] Assignee: Yasui Sangyo Co., Ltd., Japan

[21] Appl. No.: 494,165

[22] Filed: May 13, 1983

[30] Foreign Application Priority Data

Mar. 24, 1983 [JP] Japan ................................ 58-47889

[51] Int. Cl.[3] ................................................ B60P 1/48

[52] U.S. Cl. .................................................... 254/8 B

[58] Field of Search ...................... 254/2 B, 8 B, 124; 74/527, 529, 533, 534, 535, 536

[56] References Cited

U.S. PATENT DOCUMENTS 4,251,056 2/1981 Maniglia ............................ 254/8 B 4,289,299 9/1981 Kameda ............................ 254/8 B

FOREIGN PATENT DOCUMENTS 1248261 9/1971 United Kingdom ............... 254/8 B

*Primary Examiner*—Robert C. Watson

*Attorney, Agent, or Firm*—Hayes, Davis & Soloway

[57] ABSTRACT

Disclosed is a garage jack for lifting an automobile provided with an arm lock mechanism which defines two angular positions of the lifting arm so that the lifting arm is prevented from inadvertently falling, for instance, due to loss of hydraulic pressure, below the two annular positions. Since there are two such positions, the safety to the user of the garage jack is enhanced. Furthermore, the arm lock mechanism is highly simple with two engagement means provided on the lifting arm and corresponding two pawls on a rotatable shaft. This arm lock mechanism may be readily deactivated by securing a lock/unlock bar. Additionally, the garage jack is provided with a pair of composite wheels each comprised of a steel wheel and an elastic wheel so that the garage jack may be moved from one place to another very quietly thanks to the elastic wheel and may follow the motion of its lifting head when a load is applied to the lifting head and the elastic wheel has yielded under the load thanks to the steel wheel.

7 Claims, 8 Drawing Figures

GARAGE JACK FOR LIFTING AN AUTOMOBILE

This invention relates to a lifting jack for an automobile and in particular to a so-called garage jack or a service jack for an automobile which is provided with an arm lock mechanism for preventing its lifting head from falling even in case of the leakage of hydraulic fluid.

Generally, a garage jack has a lifting head which may be lifted up or lowered down by a hydraulic power unit incorporated in the frame of the jack main body by way of a lifting arm which is pivoted to the frame at its proximal end. Sometimes, from the view point of safety, an arm lock mechanism is provided in association with the lifting arm of the garage jack to prevent it from inadvertently falling due to the leakage of hydraulic fluid from the hydraulic cylinder of the power unit.

However, conventional arm lock mechanisms have the shortcomings that their structures are not durable enough to assure the safety to the users. And the failure of such an arm lock mechanism could lead to very serious accidents.

In view of such shortcomings of the arm lock mechanisms of conventional garage jacks, a primary object of this invention is to provide a garage jack for an automobile with an improved arm lock mechanism which is highly durable and reliable so that the garage jack may be utilized for servicing an automobile substantially without any danger of failure to support the automobile.

Now this invention is described in the following in terms of a specific embodiment with reference made to the appended drawings. Other objects and advantages of this invention will become more apparent from the following description and the appended drawings: in which.

Figures 1, 2:
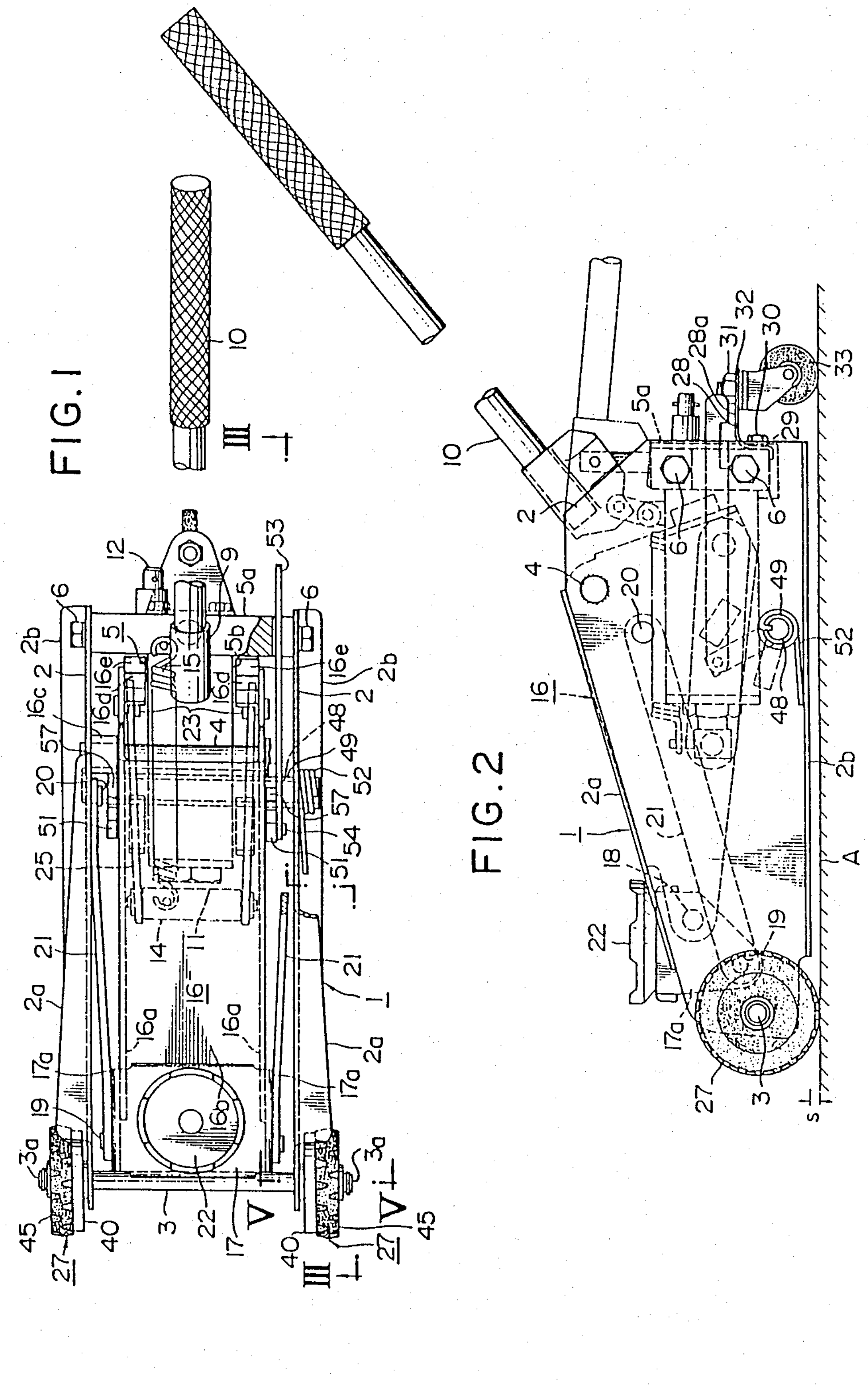
FIG. 1 is a plan view of a garage jack according to this invention.
FIG. 2 is a side view of the garage jack of FIG. 1.

As can be seen from FIGS. 1 and 2, a frame 1 of this garage jack is comprised of a pair of substantially trapezoidal side plates 2 which have laterally projecting ribs **2*a* and 2*b* at their upper and lower ends, a front rod 3 which is securely passed through the front portions of the two side plates 2 at its corresponding ends and securely attached thereto so as to keep the two side plates 2 in a mutually spaced relation, and an arm pin 4 which is passed through the two side plates 2 and fixedly secured thereto likewise to keep the two side plates 2 in a mutually spaced relation. The two side plates 2 are thus held together in a mutually parallel relation by the front rod 3 and the arm pin 4 which are both fixedly secured to the two side plates 2. And the frame 1 has a substantially rectangular configuration when seen from above as shown in FIG. 1**.

Numeral 5 denotes a power unit for driving a lifting arm 16 which is described hereinafter. This power unit 5 is comprised of a main body **5*a* shaped as a rectangular block extending laterally between the two side plates 2 and a cylinder 5*b* which projects forwardly from the front surface of the main body 5*a*** along the longitudinal axial line of the garage jack.

The side ends of the main body **5*a* are in intimate contact with the corresponding side plates 2 and are fixedly secured thereto by way of threaded bolts 6**.

This power unit 5 is of a conventional type and its action is briefly described in the following with reference to FIGS. 1 and 3.

Upon activation of a plunger 7 provided on top of the main body **5*a* by inserting a handle bar 10 into a handle socket 9 which is pivotally mounted on the cylinder 5*b* and moving the handle bar 10 up and down along an arcuate path, a piston rod 11 connected to a piston within the cylinder 5*b* is pushed forward under the pressure generated within the cylinder 5*b* as a result of the motion of the plunger 7**.

Conversely, upon activation of a knob 12 to activate a pressure relief valve not shown in the drawing, the pressure within the cylinder **5*b* is relieved and the piston rod 11 receded backwards under the biasing force generated in a coil spring 15 extending from a connecting piece 14 secured to the front end of the piston rod 11 and the main body 5*a* of the power unit 5**.

Numeral 16 denotes a lifting arm which is comprised of a pair of substantially triangular side plates **16*a*, a top plate 16*b* extending between the top ends of the two side plates 16*a* for reinforcement and a bracket 17 having a pair of downwardly bent side legs 17*a* which are pivoted to the front ends of the corresponding triangular side plates 16*a***.

A tubular collar **16*c* is fixedly attached to a rear portion of each of the side plates 16*a* of the lifting arm 16 so that each of the arm pins 4 may be received therethrough for the purpose of rotatably supporting the lifting arm 16 about the axial line of the arm pins 4**.

The rear ends of the side plates **16*a* or the lifting arm 16 are each bent inwardly to form ribs 16*f* and engagement pieces 16*e* of a rectangular shape are securely attached to the rear surface of the ribs 16*f*, defining receptacles for first lock pawls 50 which are described hereinafter with shoulders 16*d* formed on the lower ends of the engagement pieces 16*e* and the rear surface of the ribs 16*f***.

The free ends of the side plates **16*a* of the lifting arm 16 are pivoted to the corresponding side legs 17*a* of the bracket 17 by way of pins 18. Additionally, a pair of link rods 21 are each pivoted to the side legs 17*a* of the bracket 17 by way of pins 19, slightly below the position of the pins 18, at their one ends, and to the side plates 2 of the frame 1 by way of pins 20** at their other ends.

Thus, a parallelogram link mechanism is formed by the side plates 2 of the frame 1, the side plates **16*a* of the lifting arm 16, the bracket 17 and the link rods 21 so that the upper surface of the bracket 17 remains parallel to the floor surface A irrespective of the swinging motion of the lifting arm 16**.

A dish-shaped lifting head 22 is mounted on the upper surface of the bracket 17, for instance, by way of a rod appended from the lower surface of the lifting head 22 and a hole provided in the upper surface of the bracket 17 to accommodate the rod.

A pair of tension rods 25 are pivoted to the lower ends of the rear ends of the side plates 16*a* of the lifting arm 16 by way of pins 23 at their one ends and to the connecting piece 14 attached to the front end of the piston rod 11 at their other ends so that the lifting arm 16 may be swung vertically as the piston rod 11 moves horizontally along the longitudinal axis of the garage jack.

To the ends projecting laterally and outwardly from the front rod 3 beyond the corresponding side plates 2 of the frame 1 are rotatably mounted a pair of wheels 27.

More specifically, these wheels 27 are each comprised of a steel wheel 40 and a rubber wheel 45 which is fit onto a boss 42 projecting sideways from the corresponding steel wheel 40 in concentric manner and has a tread 44 around its periphery, and are rotatably mounted on the side ends 3*a* of the front rod 3 prevented from falling off by snap rings 47 by way of washers 46.

Owing to this structure of the wheels 27, the garage jack according to this invention can accurately follow the horizontal displacement of the automobile supported on the lifting head 22 in spite of the heavy load applied to the lifting head 22. Specifically, even when any rear wheel 33 is not present, a majority of the load of the automobile 35 can be carried by the wheels 27 so that the garage jack is moveable even while it is supporting the load of the automobile on its lifting head 22.

Meanwhile, a rear wheel 33 consisting of a caster wheel is carried by a horizontal piece 28*a* provided on the rear end of a bracket 28 made of a sheet spring by way of a bolt and nut 31 and a washer 32 so that the rear wheel 33 is freely rotatable about a vertical axis. The front end of the bracket 28 is in turn securely mounted to the middle part of the lower end of the main body 5*a* of the power unit 5 by way of washers 29 and bolts 30.

By way of this rear wheel 33 and the pair of front wheel 27, the lower surface of the ribs 2*b* of the side plates 2 of the frame 1 is lifted from the floor surface A by a small distance S when there is substantially no load on the lifting head 22 or when the wheels 37, 33 are supporting substantially only the weight of the garage jack itself. Hence, when there is no load on the lifting head 22, the garage jack may be freely carried over the floor surface A to wherever it is needed.

Figure 6:
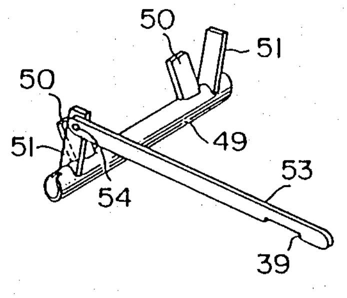
FIG. 6 is a perspective view of a rotatable shaft carrying two pairs of first lock pawls and second lock pawls.
Figure 7:
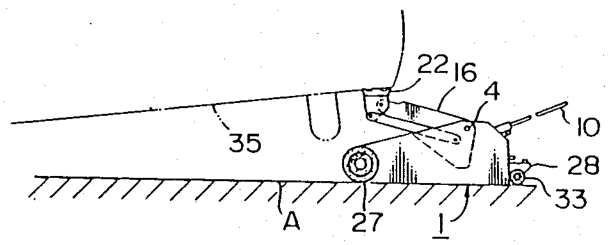
FIG. 7 is a schematic side view of the garage jack according to this invention as it is lifting a side end bottom of an automobile.

Next, the arm lock mechanism according to this invention is described in the following with reference to FIG. 1, 3 and 6.

A fixed rod 48 is fixedly secured to both the side plates 2 of the frame 1 to extend between the two side plates 2.

A hollow shaft 49 is rotatable fit onto this fixed rod 48 and two pairs of lock pawls are protruding from the outer circumference of the hollow shaft 48. As shown in detail in FIG. 6, a pair of first lock pawls 50 are securely attached to this hollow shaft 49 in radially projecting manner and another pair of second lock pawls 51 are likewise securely attached to the outside of the first lock pawls 50 in radially projecting manner, however, angularly displaced relatiVe to the first lock pawls 50. The angle between these lock pawl pairs may be, for instance, 43 degrees.

Figure 3:
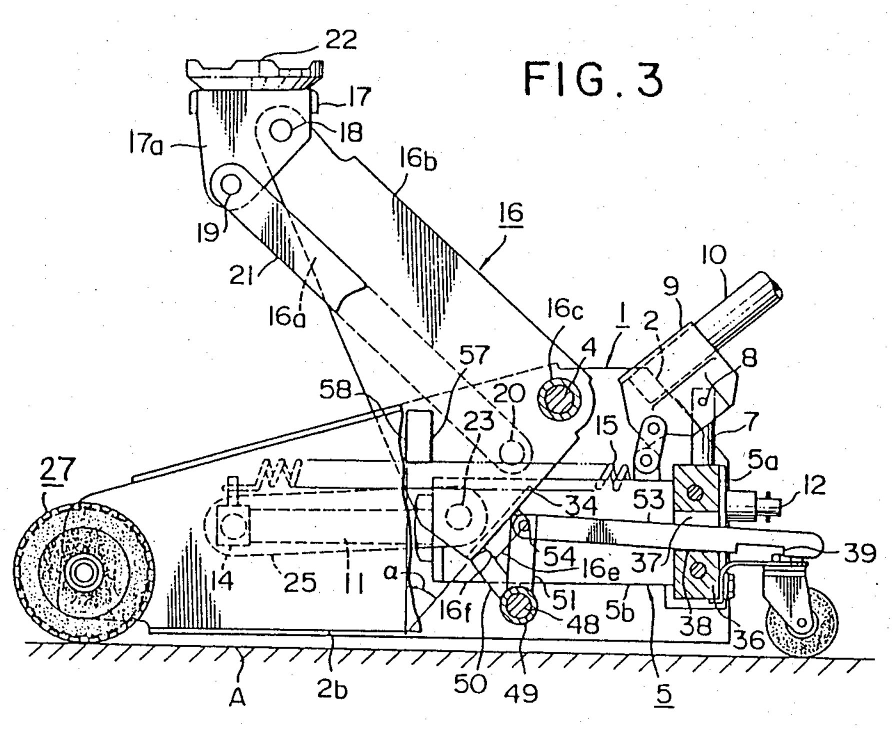
FIG. 3 is a side view of the garage jack of FIGS. 1 and 2 when a first pawl has just engaged with a receptacle formed in the rear end of a lifting arm.
Figure 4:
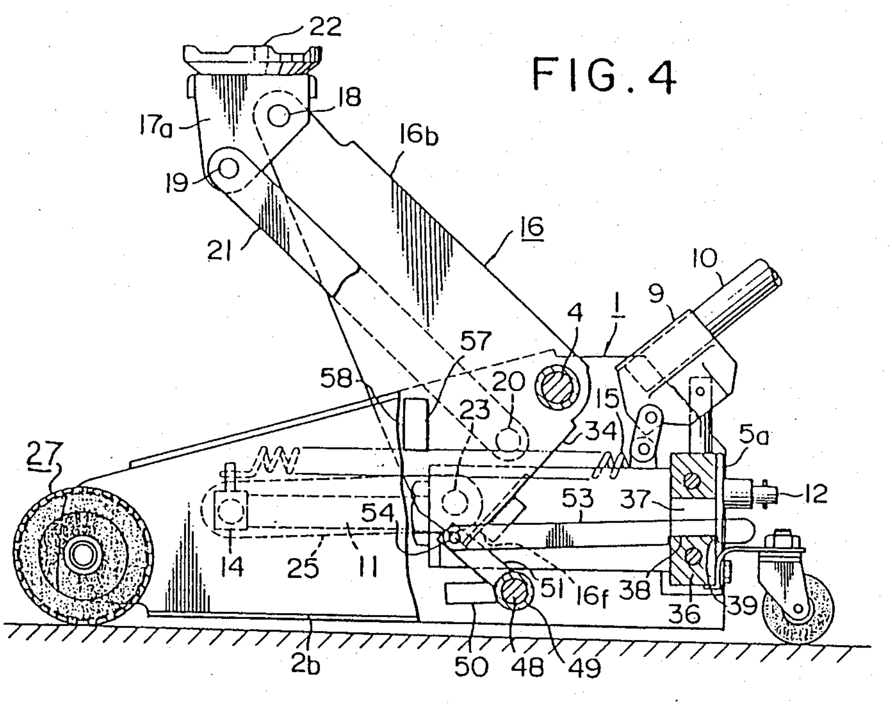
FIG. 4 is a side view similar to FIG. 3 when a lock-/unlock bar is engaged with a through hole so that the arm lock mechanism may be completely deactivated.
Figure 5:
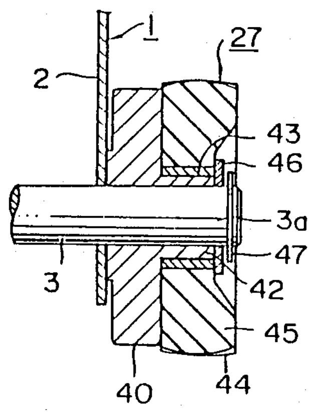
FIG. 5 is sectional view of a front wheel.
Figure 8:
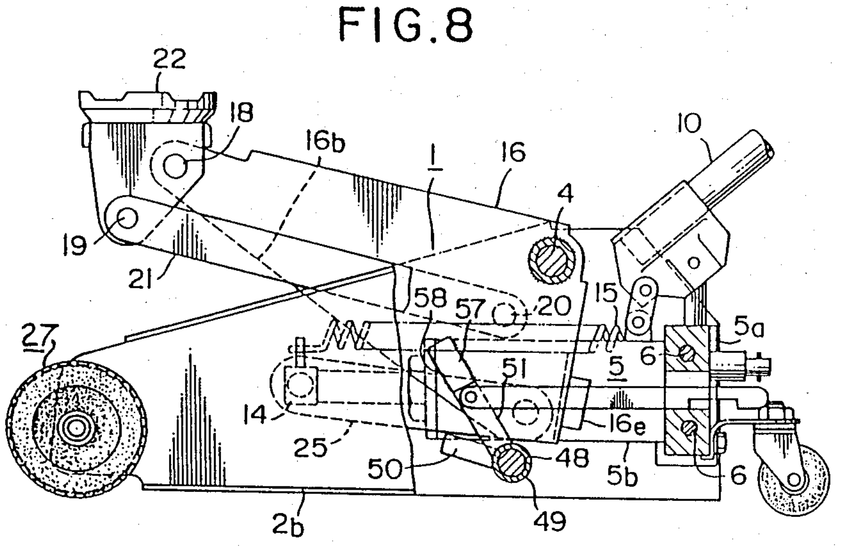
FIG. 8 is a side view of the garage jack when the second lock pawl is fully engaged with an engagement piece.

The first lock pawls 50 are adapted to be engaged by the receptacles defined by the shoulders 16*d* formed by the lower ends of the engagement pieces 16*e* and the rear surfaces of the rear ribs 16*f* of the lifting arm 16 as shown in FIG. 3 while the second lock pawls 51 are adapted to be engaged by the rear ends of the engagement pieces 57 which are securely attached to the external surfaces of the side plates 16*a* of the lifting arm 16 as shown FIG. 8.

When these lock pawls 50 and 51 are not engaged with the receptacles or the engagement pieces 57, the first lock pawls 50 are adapted to slide over the lower surface of the lifting arm 16 while the second lock pawls 51 are adapted to slide over the lower surface 58 of the engagement pieces 57 according to the positional relationship between the lifting arm 16 and the lock pawls 50 and 51.

The hollow shaft 19 is biased by a coil spring 52 engaged between the hollow shaft 49 and the bottom rib 2*b* formed on one of the side plates 2 of the frame 1 so that the hollow shaft 49 is normally biased clockwise in FIGS. 2, 3, 4 and 8.

Thus, when the lifting arm 16 is lifted up by moving the handle bar 10, the second lock pawls 51, at first, slide over the lower surface 58 of the engagement pieces 57 until the rear end of the engagement pieces 57 come to oppose the free end of the second lock pawls 51 face to face and, at the same time, the first lock pawls 50 start sliding over the lower surface of the lifting arm 16. Once the free ends of the second lock pawls 51 come to oppose the rear ends of the engagement pieces 57, the lifting head 16 is prevented from falling no further down below the position at which the free end of the second lock pawls 51 are in contact with the rear ends of the engagement pieces 57 as shown in FIG. 8.

As the lifting arm 16 is raised further up, the first lock pawls 50 come to be engaged in the receptacles formed by the ribs 16*f* and the shoulders 16*d*. The lifting arm 16 may be raised even further up but the hollow shaft 49 is prevented from further clockwise rotation by a stopper not shown in the drawings. Thus, the lifting arm 16 is prevented from falling down from the position at which the first lock pawls 50 are securely engaged by the receptacles formed by the shoulders 16*d* and the ribs 16*f* even when the lifting arm 16 is raised beyond this position.

Next, the manner of releasing the arm lock mechanism is described in the following.

To the free end of one of the second lock pawls 51 is pivoted an end of a lock/unlock bar 53 by way of a pivot pin 54, and a cut-out 39 is formed in the lower portion of the lock/unlock bar 53 so that the shoulder on either end of this cut-out 39 is engaged by the corresponding end of a hole 37 formed through the main body 5*a* of the power unit 5.

When the arm lock mechanism is to be activated, the lock/unlock bar 34 is simply pulled out from the rear end of the frame 1 to a maximum extent as shown in FIG. 3 so that the cut-out 39 may be completely out of the way of the hole 37 in the main body 5*a* of the power unit 5 and the lock/unlock bar 53 may slide freely through the hole 37 according to the condition of the contanct between the lifting arm 16 and the lock pawls 50 and 51.

When the arm lock mechanism is to be detactivated, the lock/unlock bar 53 is pushed into the frame 1 against the biasing force of the coil spring 52 until the shoulders of the cut-out 39 are fully engaged with the corresponding shoulders of both ends of the hole 37 in the main body 5*a* of the power unit 5. In this state, both the lock pawls 50 and 51 are completely out of the way of the motion of the lifting arm 16 and the lifting arm 16 may be lowered to its original substantially horizontal position once the pressure within the cylinder 5*b* is released by twisting the knob 12 of the release valve.

Thus, according to the garage jack of this invention, as the lifting arm 16 is raised to its highest possible position, it passes through two points below which the lifting arm 16 is prevented from falling inadvertently. Therefore, the safety in lifting an automobile is assured since the lifting arm drops only a small height even when the pressure of the hydraulic cylinder is lost. Furthermore, the two lock pawls 50 and 51 and the corresponding engagement pieces 57 and the receptacles formed on the rear end of the lifting arm 16 are both simple and strong for a great reliability of the lock pawl mechanism as a whole.

Additionally, the garage jack according to this invention is equipped with the front wheels 27 which are each made of a combination of a rubber wheel and a steel wheel, it can be moved freely from one place to another without making much noise thanks to the rubber wheels on one hand and can accurately follow the lateral motion of the lifting head even under a heavy load thanks to the steel wheels on the other hand.

Although the present invention was described in terms of a specific embodiment, it is obvious to a person skilled in the art that Various modifications and variations may be made thereto without departing from the spirit of this invention.

What is claimed is:

1. A garage jack for lifting an automobile provided with an arm lock mechanism for preventing inadvertent fall of a lifting arm, comprising:

a rotatable shaft which is provided with a first pawl and a second pawl in an angularly displaced relation;

a lock/unlock bar which may be selectively secured to a position to put the first and the second pawls out of their functions;

a first engagement means provided on the rear end of the lifting arm to prevent the fall of the lifting arm below a first position by engaging with the first pawl; and a second engagement means provided on the lifting arm comprising of a pair of substantially triangular side plates, a top plate extending between the top ends of the two side plates and is rotatably supported by a tubular collar attached to a rear portion of each of side plates of the lifting arm for preventing the fall of the lifting arm below a second position by engaging with the second pawl;

said rotatable shaft carrying the first and the second pawls being normally biased by a spring means to their active states.

2. A garage jack for lifting an automobile according to claim 1, wherein, as the lifting arm is raised from a substantially horizontal position to its maximum possible height, the second pawl at first slides over a side surface of the second engagement means before the second pawl becomes fully engageable with the second engagement means and, at the same time, the first pawl starts sliding over the lower surface of the lifting arm before the first pawl becomes fully engageable with the first engagement means.

3. A garage jack for lifting an automobile according to claim 2, wherein the first engagement means is comprised of a receptacle formed by a rib formed on the rear end of the lifting arm and a shoulder formed by a block which is securely attached to the rib while the second engagement means is comprised of a piece securely attached to a side plate of the lifting arm.

4. A garage jack for lifting an automobile according to claim 3, wherein the lock/unlock bar is provided with a cut-out which may be engaged to a through hole provided in the frame of the garage jack so as to be secured to the position to put the first and the second pawls out of their functions while the rotatable shaft carrying the first and the second pawls is biased to their active position by a coil spring engaged between the rotatable shaft and the frame of the garage jack.

5. A garage jack for lifting an automobile according to claim 4, wherein the pawls are comprised of substantially rectangular pieces which are securely attached to the rotatable shaft in radially projecting manner and mutually circumferentially displaced manner.

6. A garage jack for lifting an automobile provided with an arm lock mechanism for preventing inadvertent fall of a lifting arm, comprising:

a rotatable shaft which is provided with a first pawl and a second pawl in an angularly displaced manner;

a lock/unlock bar which may be selectively secured to a position to put the first and the second pawls out of their functions;

a first engagement means provided on the rear end of the lifting arm to prevent the fall of the lifting arm below a first position by engaging with the first pawl;

a second engagement means provided on another part of the lifting arm to prevent the fall of the lifting arm below a second position by engaging with the second pawl;

a pair of front wheels which are each comprised of a steel wheel and an elastic wheel having a slightly greater diameter than the steel wheel which are securely attached to one another in concentric manner, the elastic wheel being elastic enough to yield under a load applied to the lifting arm so that the load may be born directly by the steel wheel; and a rear wheel which is provide on the rear end of the frame of the garage jack so as to be rotatable about a vertical axis;

the rotatble shaft carrying the first and the second pawls being normally biased by a spring means to their active states.

7. A garage jack for lifting an automobile according to claim 6, wherein the rear wheel is provided on an elastic piece which is securely attached to the frame of the garage jack, the elastic piece being flexible enough to yield under a load on the lifting arm so that the bottom of the frame of the garage jack comes to direct contact with the floor surface to bear the load thereby.

* * * * *